US012732734B2

(12) United States Patent
Kwan et al.

(10) Patent No.: US 12,732,734 B2
(45) Date of Patent: Sep. 8, 2026

(54) SYSTEMS FOR AND METHODS FOR SYNCHRONIZING AUDIO CONTENT

(71) Applicant: Avago Technologies International Sales Pte. Limited, Singapore (SG)

(72) Inventors: Chikan Kwan, San Diego, CA (US); Kuang-Ying Hsi, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 142 days.

(21) Appl. No.: 18/896,344

(22) Filed: Sep. 25, 2024

(65) Prior Publication Data

US 2026/0089427 A1 Mar. 26, 2026

(51) Int. Cl.
*H04R 1/10* (2026.01)

(52) U.S. Cl.
CPC ....... *H04R 1/1041* (2013.01); *H04R 2420/07* (2013.01)

(58) Field of Classification Search
CPC .... H04R 2420/07; H04R 1/1041; H04L 69/00
See application file for complete search history.

(56) References Cited

U.S. PATENT DOCUMENTS

| | | | | |
|---|---|---|---|---|
| 8,155,335 | B2 | 4/2012 | Rutschman | |
| 8,180,078 | B2 | 5/2012 | Zellner | |
| 8,706,038 | B2 | 4/2014 | Sharma | |
| 9,002,044 | B2 | 4/2015 | Dinescu et al. | |
| 9,516,401 | B2 | 12/2016 | Mccarthy et al. | |
| 9,794,670 | B2 | 10/2017 | Rodzevski et al. | |
| 9,838,829 | B2 | 12/2017 | El-Hoiydi | |
| 10,674,465 | B2 * | 6/2020 | Kindred | H04W 56/005 |
| 10,728,941 | B2 * | 7/2020 | Batta | H04M 1/6066 |
| 11,452,172 | B2 | 9/2022 | Gong et al. | |
| 11,683,735 | B2 | 6/2023 | Belverato | |
| 11,737,158 | B2 * | 8/2023 | Sokolov | H04R 5/033 370/328 |
| 2004/0042629 | A1 | 3/2004 | Mellone et al. | |

(Continued)

FOREIGN PATENT DOCUMENTS

| | | | |
|---|---|---|---|
| CA | 2783614 | C | 1/2016 |
| DE | 20 2010 007 982 | U1 | 11/2010 |

(Continued)

*Primary Examiner* — David L Ton
(74) *Attorney, Agent, or Firm* — Foley & Lardner LLP

(57) ABSTRACT

Audio synchronization is provided. A method includes establishing, by a primary earbud of a pair of earbuds, a first connection with a device, the primary earbud receiving audio data from the device via the first connection. The method includes establishing, between the primary earbud and a shadow earbud, a bridge connection, the shadow earbud receiving the audio data and link characteristics via the bridge connection to establish a shadow connection with the device to receive the audio data from the device. The method includes maintaining, by the shadow earbud, a timing relationship between the bridge connection and the shadow connection. The method includes detecting, by the shadow earbud, a failure to receive on the shadow connection. The method includes using, by the shadow earbud, the timing relationship to synchronize a timing window for which to communicate with the device.

20 Claims, 7 Drawing Sheets

(56) References Cited

U.S. PATENT DOCUMENTS

| | | | |
|---|---|---|---|
| 2005/0037823 | A1 | 2/2005 | Seshadri et al. |
| 2006/0251277 | A1 | 11/2006 | Cho |
| 2007/0030988 | A1 | 2/2007 | Bauml et al. |
| 2007/0133764 | A1 | 6/2007 | Goldberg |
| 2007/0149261 | A1 | 6/2007 | Huddart |
| 2007/0249411 | A1 | 10/2007 | Hyatt |
| 2008/0170740 | A1 | 7/2008 | Gantz |
| 2008/0298606 | A1 | 12/2008 | Johnson et al. |
| 2009/0017868 | A1 | 1/2009 | Ueda et al. |
| 2009/0109894 | A1 | 4/2009 | Ueda et al. |
| 2010/0260361 | A1 | 10/2010 | Yamkovoy |
| 2011/0007916 | A1 | 1/2011 | Chapero-Rueda et al. |
| 2012/0121095 | A1 | 5/2012 | Popovski et al. |
| 2016/0182991 | A1 | 6/2016 | Zakzeski et al. |
| 2016/0323677 | A1 | 11/2016 | Solum |
| 2019/0230459 | A1* | 7/2019 | Sridharan ................. G06F 3/16 |
| 2020/0396028 | A1* | 12/2020 | Haartsen ................. H04L 69/40 |
| 2020/0413456 | A1* | 12/2020 | Chen .................... H04R 1/1041 |
| 2022/0174628 | A1 | 6/2022 | Tkaczuk et al. |
| 2022/0312167 | A1* | 9/2022 | Gong .................... H04L 1/1864 |
| 2023/0300510 | A1 | 9/2023 | Chen |

FOREIGN PATENT DOCUMENTS

| | | | | |
|---|---|---|---|---|
| DE | 10 2016 118 068 | A1 | 9/2016 | |
| EP | 1 589 710 | A1 | 10/2005 | |
| EP | 1 715 723 | B2 | 10/2006 | |
| EP | 2 829 149 | B1 | 1/2015 | |
| EP | 3918734 | B1 * | 12/2022 | ........... H04R 1/1016 |
| EP | 3782382 | B1 * | 7/2023 | ........... H04B 17/309 |
| GB | 2 447 501 | A | 9/2008 | |
| GB | 2 585 104 | A | 12/2020 | |
| IN | 5496CHENP2008 | A | 3/2009 | |
| IN | 1639MUMNP2009 | A | 4/2010 | |
| IN | 1073CHENP2012 | A | 4/2013 | |
| IN | 267848 | A1 | 8/2015 | |
| IN | 321881 | A1 | 10/2019 | |
| IN | 202021046910 | A | 11/2021 | |
| IT | 20100015.5 | U1 | 4/2012 | |
| TW | 280063 | U | 3/2005 | |
| TW | 815165 | B | 9/2023 | |
| WO | WO-2009/014925 | A2 | 1/2009 | |
| WO | WO-2009/076205 | A2 | 6/2009 | |
| WO | WO-2020/133183 | A1 | 7/2020 | |

* cited by examiner

400

SYSTEMS FOR AND METHODS FOR SYNCHRONIZING AUDIO CONTENT

FIELD OF THE DISCLOSURE

This disclosure generally relates to systems and methods for communication between audio devices, such as between a pair of Bluetooth earbuds.

BACKGROUND OF THE DISCLOSURE

In the last few decades, the market for wireless communications devices has grown by orders of magnitude, fueled by the use of portable devices, and increased connectivity and data communication between all manners of devices. Digital and radio frequency (RF) circuit fabrication improvements, as well as advances in circuit integration and other aspects have made wireless equipment smaller, cheaper, and more reliable. However, these wireless devices may be constrained by finite battery power, and intermittent connectivity owing to environmental conditions or obstructions. Managing link states between devices upon interruptions to connectivity can impact battery life as devices fruitlessly enable radios for extended temporal windows or enter a sleep state and thereby fail to receive data transmissions.

SUMMARY

A pair of earbuds can connect with a source device for audio data (e.g., a mobile phone). For example, a first of the pair of earbuds can connect with the phone, via a first link while a second of the pair of earbuds can monitor the first link. The first link is sometimes referred to, without limiting effect, as a primary link, and the earbud connected with the phone is sometimes referred to, without limiting effect, as a primary earbud. The second earbud is sometimes referred to as a shadow earbud, and the signal path of the primary link as monitored by the shadow earbud is sometimes referred to as a shadow link. The first and second earbud can connect with one another via a further link, referred to as a bridge connection. For example, the shadow earbud can receive audio data or link characteristics via the bridge connection. The shadow earbud can, thereafter monitor over-the-air packets transmitted from the mobile phone to the primary earbud using the link characteristics received via the bridge connection.

The shadow earbud can synchronize to the phone when it can successfully receive packets on the shadow connection. Particularly, the shadow earbud can update its timing of an anchor point on the shadow connection if it receives a packet from the phone. However, where no audio data is received, the shadow earbud might adjust its receive time (expand an receive, RX, window) to allow for the uncertainty of the transmission timing of the phone. The shadow earbud can maintain a timer which is reset upon reception of a valid packet. The timer is sometimes referred to as a supervision timer which enforces a supervision timeout value. The shadow earbud can determine that the connection is lost when the timer reaches the supervision timeout value.

In certain user scenarios, the signal quality of the shadow connection is poor while that of the bridge connection is good. For example, when a user wearing both earbuds walks away from the phone, the primary earbud can remain in connection with the phone, while the shadow earbud, being disposed across a body obstruction, may impair the integrity of the shadow link. In this scenario, the shadow earbud can miss data transmitted via the shadow connection, which leads to the following disadvantages. First, power consumption may increase incident to adjustments to an RX window. When the shadow earbud fails to receive data from the phone over the shadow link reliably, it may widen an RX window on the shadow connection. However, these power-consumptive attempts are futile because shadow earbud is out of the communication range of the phone. In addition, if the shadow connection is dropped, the software stack may repeatedly attempt to re-establish the connection without success, which also increases power consumption. Second, the shadow earbud may expand its RX window until it receives data from another device, such as the primary earbud, whereupon it may synchronize to the other device (e.g., the primary earbud). The shadow earbud may synchronize with the primary earbud, such that it may not recover the shadow connection. Third, when the shadow earbud is moved back within the communication range of the phone, a delay before the audio resumes is incurred while the shadow connection is re-established.

According to the present disclosure, a mechanism for the shadow earbud to maintain clock synchronization with the phone through the bridge connection when the signal quality of the shadow connection is poor is provided. The shadow earbud preserves a timing relationship between the bridge and the shadow connections. When the shadow earbud is synchronized to the primary earbud on the bridge connection, it will also be able to synchronize its clock to that of the phone using this timing relationship. The shadow earbud can be considered synchronized to the phone—even when it fails to receive on the shadow connection—as long as the primary connection and the bridge connection stay connected. In some embodiments, the shadow earbud only resets the supervision timer upon reception of a valid packet on the shadow connection. In some embodiments, the shadow earbud resets the supervision timer upon reception of a valid packet on the shadow connection or on the bridge connection. Accordingly, the supervision timer can be extended when the bridge connection is connected.

According to these techniques, power consumption may be reduced, relative to other approaches. For example, the RX window on the shadow connection can remain as small and accurate, as if its clock was synchronized in the last connection event of the bridge connection. This reduces power consumption compared to the case where the shadow earbud relies solely on receiving from the shadow connection to update its clock. In addition, since the shadow connection is maintained even when the signal quality is bad, the software stack will not be engaged to enter into a repetitive cycle of failing to create a shadow connection. Further, the small receive window on the shadow earbud avoids synchronizing to an incorrect device. When the shadow earbud is out of the range of the phone and if the primary earbud is capable of relaying audio to the shadow earbud, the audio quality will be maintained even when the shadow earbud cannot receive from the phone over the shadow link. When the shadow earbud moves back into range, it will start receiving data over the shadow connection from the phone. The source of the audio (either relayed over the bridge connection by the primary earbud or received from the phone via the shadow connection) may be performed transparently to an end user without interruption or delay in a user experience.

Further, according to some implementations of the present disclosure, the user can hear audio from both earbuds even when one of them cannot receive the audio from the phone, as may provide seamless audio playback for the user. For example, the supervision timer can be ignored, or tolled upon a receipt of audio data via the bridge connection. In some implementations of the present disclosure, a supervision timer can be enforced with regard to the shadow connection. Although, in some circumstances, the seamless user experience may be somewhat diminished upon the expiration of the supervision timer while the shadow earbud waits for the re-establishment of the shadow connection (if the earbud is out of the range of the phone), such an implementation can extend battery life of a pair of earbuds. Further, in some embodiments, the supervision timer can be enforced with regard to the shadow connection and the bridge connection (e.g., a logical OR of the shadow connection and the bridge connection). Accordingly, the expiration of the supervision timer may correspond to a condition where no audio data is available to the shadow earbud, such that the expiration of the supervision timer may not actually interrupt any audio data.

BRIEF DESCRIPTION OF THE DRAWINGS

Various objects, aspects, features, and advantages of the disclosure will become more apparent and better understood by referring to the detailed description taken in conjunction with the accompanying drawings, in which reference characters identify corresponding elements throughout. In the drawings, like reference numbers generally indicate identical, functionally similar, and/or structurally similar elements.

Figure 1A:
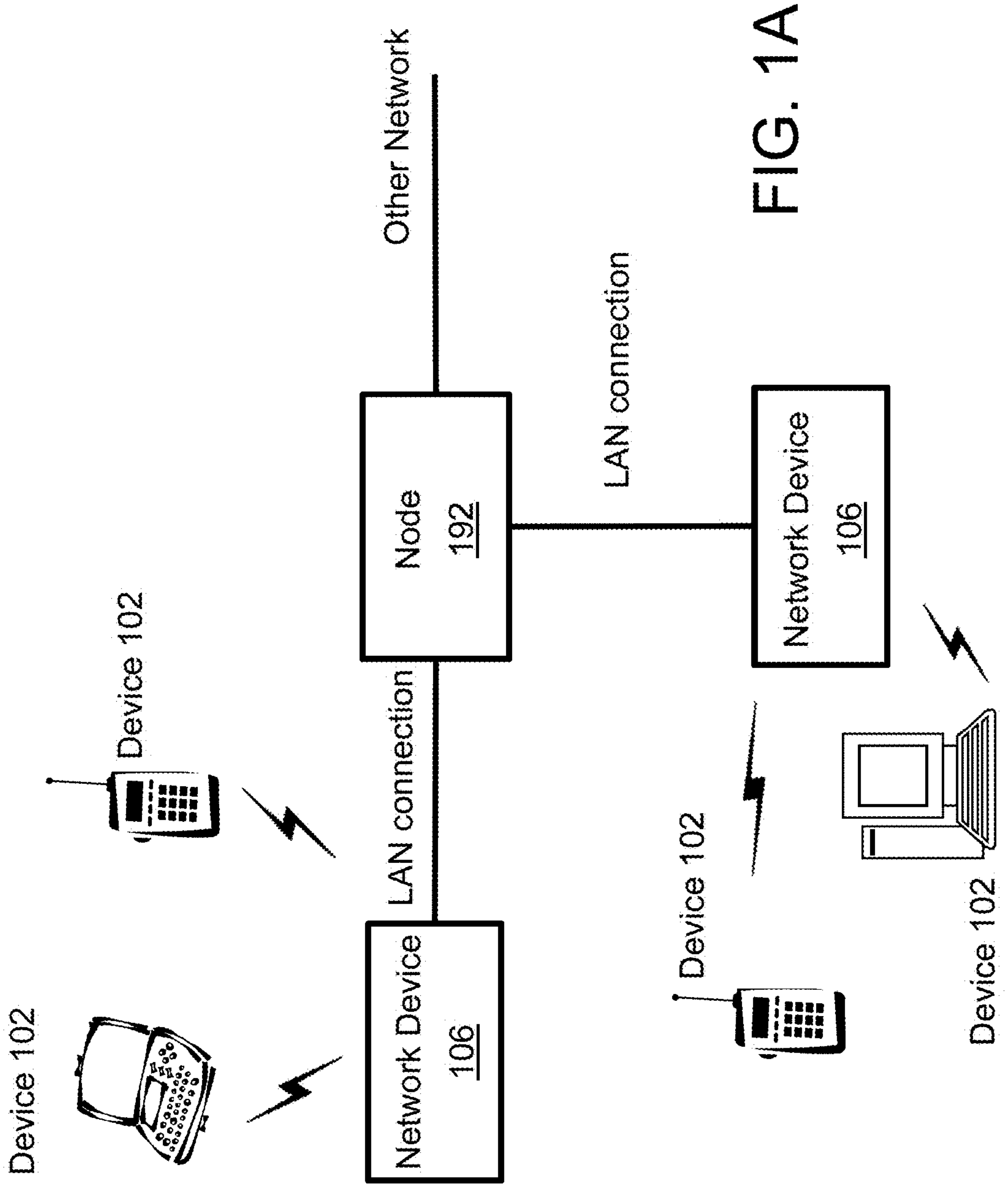
FIG. 1A is a block diagram depicting a network environment including one or more access points in communication with one or more devices or stations, according to some embodiments.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

In some embodiments, the techniques described herein relate to a method including establishing, by a primary earbud of a pair of earbuds, a first connection with a device, the primary earbud receiving audio data from the device via the first connection; establishing, between the primary earbud and a shadow earbud, a bridge connection, the shadow earbud receiving the audio data and link characteristics via the bridge connection to establish a shadow connection with the device to receive the audio data from the device; maintaining, by the shadow earbud, a timing relationship between the bridge connection and the shadow connection; detecting, by the shadow earbud, a failure to receive on the shadow connection; and using, by the shadow earbud, the timing relationship to synchronize a timing window for which to communicate with the device.

In some embodiments, the techniques described herein relate to a method, further including detecting, by the shadow earbud, a restoration of the audio data subsequent to the failure to receive; and adjusting, by the shadow earbud, the timing relationship to resynchronize with the device.

In some embodiments, the techniques described herein relate to a method, further including detecting, by the shadow earbud, subsequent to the failure to receive and prior to the restoration of the audio data, an indication of a status of the first connection via the bridge connection; and extending, by the shadow earbud, responsive to the detection of the indication, a timer during which the shadow earbud is to receive the audio data via the shadow connection to maintain an active state.

In some embodiments, the techniques described herein relate to a method, further including transmitting, by the primary earbud, the indication to the shadow earbud, the indication including the audio data.

In some embodiments, the techniques described herein relate to a method, further including detecting the audio data via at least one of the shadow connection or the bridge connection; and extend a timer during which the shadow earbud is to receive the audio data via the shadow connection to maintain an active state, responsive to the detection of the audio data.

In some embodiments, the techniques described herein relate to a method, further including transitioning to an inactive state, responsive to an expiration of a timer for at least one of the shadow connection or the bridge connection.

In some embodiments, the techniques described herein relate to a method, wherein the shadow earbud is configured to receive, from the primary earbud over the bridge connection, a credential; and using the credential to establish the shadow connection.

In some embodiments, the techniques described herein relate to a method, wherein the first connection is a first Bluetooth link between the device and the primary earbud; and the bridge connection is a second Bluetooth link between the primary earbud and the shadow earbud.

In some embodiments, the techniques described herein relate to a method, wherein the second Bluetooth link is a lower power connection than the first Bluetooth link.

In some embodiments, the techniques described herein relate to a method, further including identifying between the pair of earbuds a first earbud of the pair of earbuds as the primary earbud; and a second earbud of the pair of earbuds as the shadow earbud.

In some aspects, the techniques described herein relate to a system including a primary earbud, the primary earbud configured to establish a first connection with a device, the first connection configured to convey audio data from the device to the primary earbud; and establish a bridge connection with a shadow device, the bridge connection configured to communicate link characteristics including a timing window for the first connection; and a shadow earbud, the shadow earbud configured to detect a failure to receive the audio data during the same timing window; maintain, based at least on an indication of a status of the first connection, received via the bridge connection the timing window for a shadow connection to receive the audio data; and receive, using the same timing window, subsequent audio data.

In some embodiments, the techniques described herein relate to a system, wherein the shadow earbud is configured to extend, responsive to a detection of a first of a plurality of packets carrying the audio data via the shadow connection, a timer during which the shadow earbud is to receive the audio data via the shadow connection to maintain an active state; detect an expiration of the timer without detection any further or subsequent one or more packets; and transition to a lower power state or mode, responsive to the expiration of the timer.

In some embodiments, the techniques described herein relate to a system, wherein the shadow earbud is configured to extend, responsive to a detection of a second of the plurality of packets via the bridge connection, the timer.

In some embodiments, the techniques described herein relate to a system, wherein the shadow earbud is configured to adjust the timing window based on data received via the bridge connection.

In some embodiments, the techniques described herein relate to a system, wherein the data received via the bridge connection includes a packet including a portion of the audio data.

In some embodiments, the techniques described herein relate to a system, wherein the first connection is a first Bluetooth link between the device and the primary earbud; and the bridge connection is a second Bluetooth link between the primary earbud and the shadow earbud, wherein the second Bluetooth link is a lower power connection than the first Bluetooth link.

In some embodiments, the techniques described herein relate to a device including an audio output device configured to negotiate a role of a plurality of roles with a second audio output device, the plurality of roles corresponding to a primary mode and a shadow mode between the audio output device and the second audio output device; during the primary mode establish a first connection with an audio source device, the first connection configured to convey audio data from the audio source device to the audio output device; and establish a bridge connection with the second audio output device, the bridge connection configured to communicate link characteristics for the first connection; and during the shadow mode detect, via a shadow connection using the link characteristics to monitor the first connection, a timing window for the audio data; detect a failure to receive the audio data during the timing window on the shadow connection; and extend a timer during which the audio output device is to receive the audio data via the shadow connection to maintain an active state, responsive to a receipt of a packet including the audio data via the bridge connection.

In some embodiments, the techniques described herein relate to a device, further configured to extend, in the shadow mode, the timer responsive to a receipt of a packet including the audio data via the shadow connection.

In some embodiments, the techniques described herein relate to a device, further configured to transmit, during the primary mode, the audio data received via the first connection to the second audio output device via the bridge connection; and transitioning to an inactive state, during the shadow mode, responsive to an expiration of the timer without receipt of the audio data during the timing window.

In some embodiments, the techniques described herein relate to a device, wherein: the first connection is a first Bluetooth link between the audio source device and the audio output device; and the bridge connection is a second Bluetooth link between the audio output device and the second audio output device, wherein the second Bluetooth link is a lower power connection than the first Bluetooth link.

For purposes of reading the description of the various embodiments below, the following descriptions of the sections of the specification and their respective contents can be helpful:

Section A describes a network environment and computing environment which can be useful for practicing embodiments described herein; and Section B describes embodiments of access protocols and methods and devices using access protocols.

A. Computing and Network Environment

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) or network devices 106, one or more stations or wireless communication devices 102 and a network hardware component or network hardware 192. The wireless communication devices 102 can for example include laptop computers, tablets, personal computers, and/or cellular telephone devices. The details of an embodiment of each station or wireless communication device 102 and AP or network device 106 are described in greater detail with reference to FIGS. 1B and 1C. The network environment can be an ad hoc network environment, an infrastructure wireless network environment, a subnet environment, etc. in one embodiment. The network devices 106 or APs can be operably coupled to the network hardware 192 via local area network connections. Network devices 106 are 5G base stations in some embodiments. The network hardware 192, which can include a router, gateway, switch, bridge, modem, system controller, appliance, etc., can provide a local area network connection for the communication system. Each of the network devices 106 or APs can have an associated antenna or an antenna array to communicate with the wireless communication devices in its area. The wireless communication devices 102 can register with a particular network device 106 or AP to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to network device 106 or AP.

In some embodiments, a network device 106 or AP includes a device or module (including a combination of hardware and software) that allows wireless communication devices 102 to connect to a wired network using wirelessfidelity (WiFi), or other standards. A network device 106 or AP can sometimes be referred to as a wireless access point (WAP). A network device 106 or AP can be implemented (e.g., configured, designed and/or built) for operating in a wireless local area network (WLAN). A network device 106 or AP can connect to a router (e.g., via a wired network) as a standalone device in some embodiments. In other embodiments, network device 106 or AP can be a component of a router. Network device 106 or AP can provide multiple devices access to a network. Network device 106 or AP can, for example, connect to a wired Ethernet connection and provide wireless connections using radio frequency links for other devices 102 to utilize that wired connection. A network device 106 or AP can be implemented to support a standard for sending and receiving data using one or more radio frequencies. Those standards, and the frequencies they use can be defined by the IEEE (e.g., IEEE 802.11 standards). A network device 106 or AP can be configured and/or used to support public Internet hotspots, and/or on a network to extend the network's Wi-Fi signal range.

In some embodiments, the access points or network devices 106 can be used for (e.g., in-home, in-vehicle, or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points or network devices 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points or network devices 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
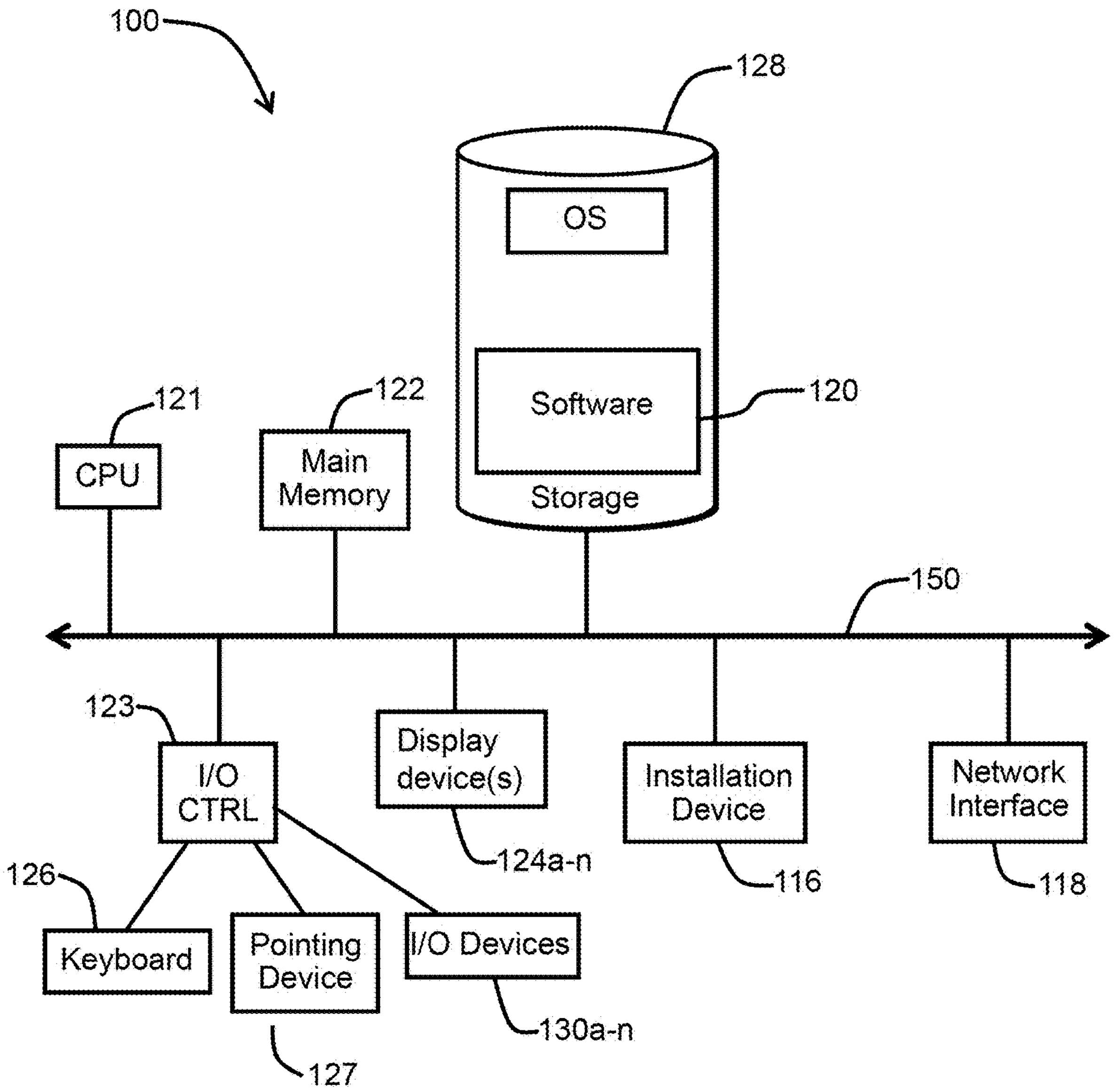
FIGS. 1B and 1C are block diagrams depicting computing devices useful in connection with the methods and systems described herein, according to some embodiments.
Figure 1C:
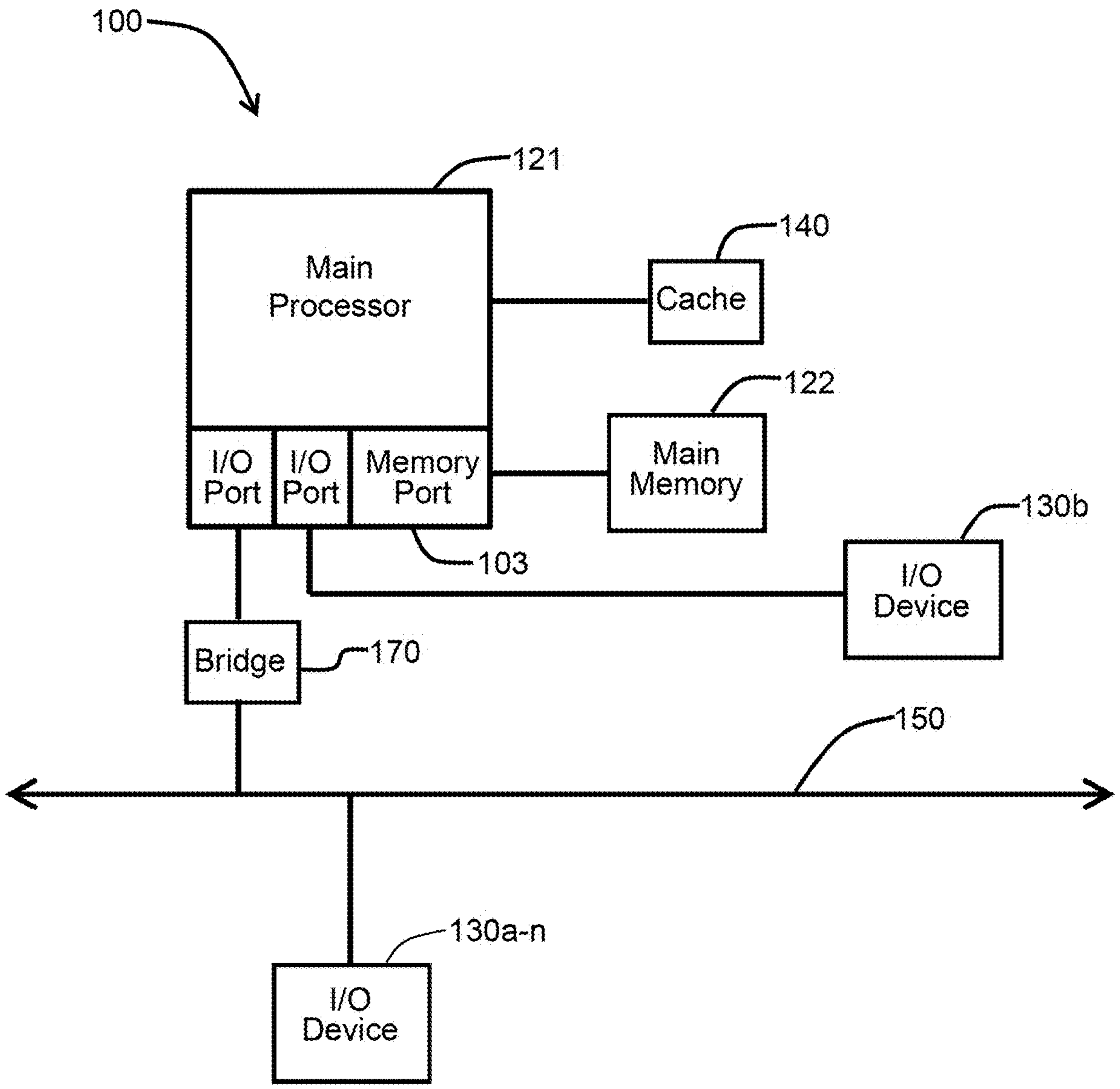

The communications device(s) 102 and access point(s) or network devices 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or network device 106. As shown in FIGS. 1B and 1C, each computing device 100 includes a processor 121 (e.g., central processing unit), and a main memory unit 122. As shown in FIG. 1B, a computing device 100 can include a storage device 128, an installation device 116, a network interface 118, an I/O controller 123, display devices 124*a*-124*n*, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130*a*-130*n*, and a cache memory 140 in communication with the central processing unit or processor 121.

The central processing unit or processor 121 is any logic circuitry that responds to and processes instructions fetched from the main memory unit 122. In many embodiments, the central processing unit or processor 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor or processor 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the processor 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit or processor 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer or computer system 100 in which the main processor 121 can communicate directly with I/O device 130*b*, for example via HYPERTRANSPORT, RAPIDIO, or INFINIBAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124*a*-124*n*. As such, any of the I/O devices 130*a*-130*n* and/or the I/O controller 123 can include any type and/or form of suitable hardware, software, or combination of hardware and software to support, enable or provide for the connection and use of the display device(s) 124*a*-124*n* by the computing device 100. For example, the computing device 100 can include any type and/or form of video adapter, video card, driver, and/or library to interface, communicate, connect or otherwise use the display device(s) 124*a*-124*n*. In one embodiment, a video adapter can include multiple connectors to interface to the display device(s) 124*a*-124*n*. In other embodiments, the computing device 100 can include multiple video adapters, with each video adapter connected to the display device(s) 124*a*-124*n*. In some embodiments, any portion of the operating system of the computing device 100 can be configured for using multiple display devices 124*a*-124*n*. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a fiber optic bus, a Serial Attached small computer system interface bus, a USB connection, or a HDMI bus.

A computing device 100 of the sort depicted in FIGS. 1B and 1C can operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8 and 10, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system or computing device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Synchronizing Audio Content

Disclosed herein are systems and methods of synchronizing audio content between a mobile phone or other audio source device and sink devices such as a pair of earbuds. The sink devices can include a primary and shadow device, as may be predetermined (e.g., hard-coded) or arbitrated therebetween. The primary sink device can establish a first connection with the audio source device and receive audio data (e.g., packetized audio data) from the audio source device. The primary sink device can establish a bridge connection with the shadow sink device, to provide link characteristic data with the shadow sink device. The shadow sink device can use the link characteristic data to establish a shadow connection (monitoring the audio data exchanged over the connection between the source device and the primary sink device). However, in some circumstances, the shadow connection can become impaired; in some cases, such impairment may correspond to a continued provision of audio data from the audio source device to the primary sink device over the first connection.

Maintaining the shadow connection upon substantial impairment (e.g., failure to decode packets) may inhibit future operations. For example, the shadow sink device can increase an RX window during which a transceiver is active to attempt to resolve timing offsets. In some circumstances, the widened RX window may eventually include timeslots from other devices (e.g., the primary sink device). If the shadow sink device synchronizes to such a transmission, the shadow sink device may not detect further audio data even if it is in range (because the transmission window is narrowed upon synchronization, as a power savings measure to reduce transceiver active time). Even if no such resynchronization occurs, the widened RX window may unnecessarily deplete a battery of the shadow sink device. Accordingly, the shadow sink device can instantiate a timer which is extended (e.g., reset) upon receipt of a status of the first link between the audio source device and the primary sink device. In some embodiments, the indication includes a receipt of audio data over the shadow connection. In some embodiments, the indication is provided responsive to a transmission within an original RX window. In some embodiments, the indication is received over the bridge connection. For example, the indication can include a conveyance of audio data from the primary sink device (e.g., as may be provided responsive to an indication of a failure to receive audio data communicated from the shadow sink device to the primary sink device), a flag bit indicating a state of the connection, or so forth.

Figure 2:
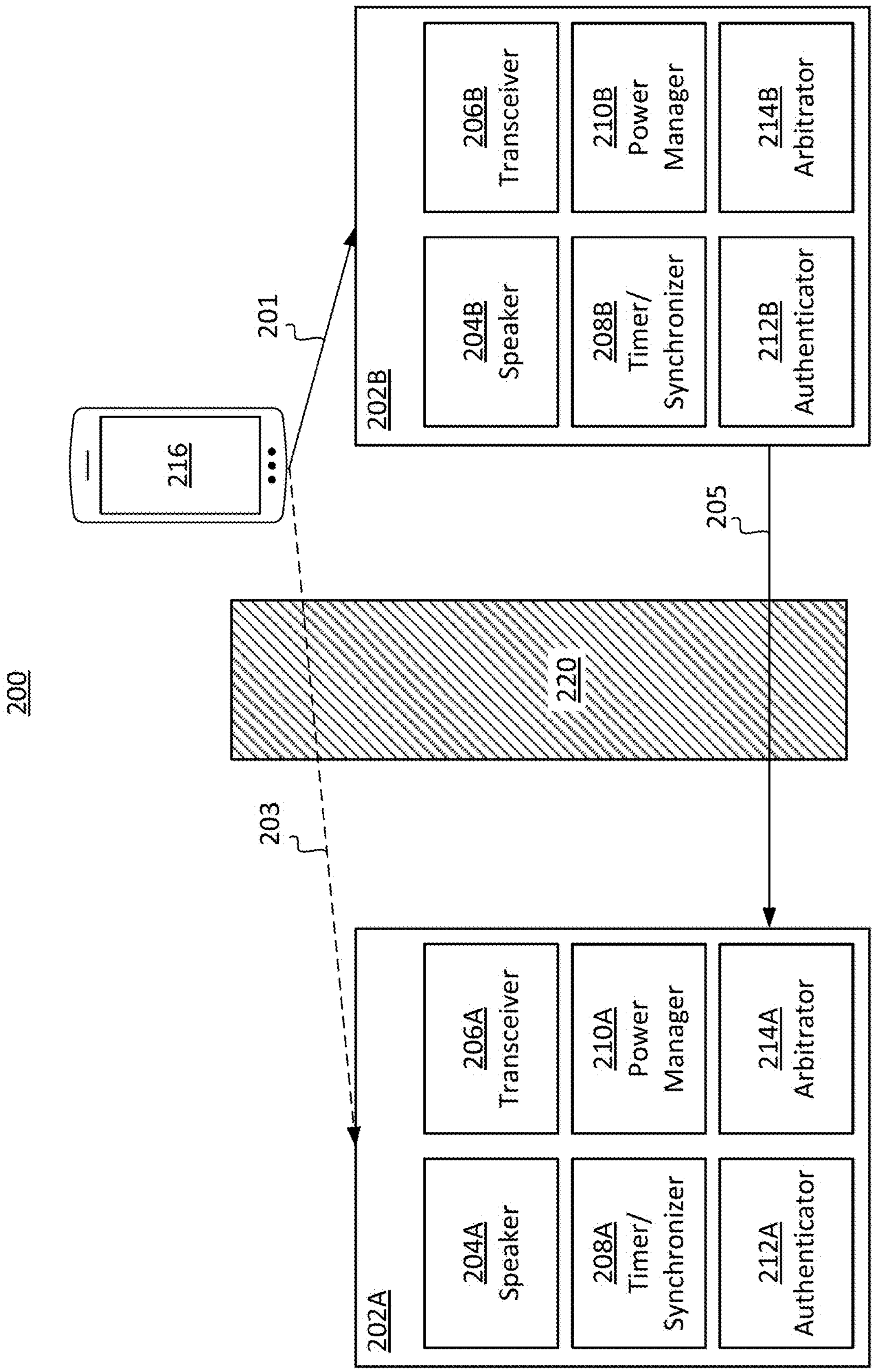
FIG. 2 is a network diagram for an environment including a pair of audio devices coupled with a source audio device, according to some embodiments.

With reference to FIG. 2, a network diagram 200 for an environment including a pair of audio devices 202 coupled with an audio source device 216 is provided, according to some embodiments. The pair of audio devices 202 can include any of various audio devices, such as the illustrative examples of a first device of a shadow earbud 202A and a second device of a primary earbud 202B. This illustrative example should not be construed as limiting; the systems and methods provided herein may be employed with wireless speakers, hearing aids, VR/AR headsets, or so forth. The illustrative example of earbuds, as referred to throughout the present disclosure, may be substituted for various other devices.

A pair of earbuds 202 may refer to or include two wireless earphones designed or configured to work together, providing audio via a speaker from received audio data. For example, the pair of earbuds can split the audio data into left and right channels. The pair of earbuds can include a primary earbud 202B and a shadow earbud 202A, which may be dynamically arbitrated or predefined. The primary earbud 202B may refer to or include an earbud which actively establishes a connection with a device providing audio content. For example, the primary earbud 202B can include a Bluetooth peripheral. The shadow earbud 202A may refer to or include a second earbud of the pair of earbuds which relies on the primary earbud 202B for its connection to the audio source, such as by providing link characteristics of the connection between the primary earbud 202B and the device, or by providing audio data itself.

Audio data may refer to or include digital information representing audio waves generated for output to speaker-transducers (e.g., audio drivers of the earbud pair). For example, the audio data may be conveyed as packets, frames, or other streams. The audio data may be conveyed over any of the various connections described herein. Various references to audio data need not refer to bit-for-bit copies of the same data. For example, audio data may be restructured (e.g., repacketized, provided according to a different format, manipulated to remove right or left channel audio, etc.).

A connection refers to any type and form of link established between at least two devices. The connection may be established using any type or form of protocol, such as Wi-Fi protocol or Bluetooth protocol. For example, a connection established between a primary earbud and another device may refer to or include a connection configured to convey data, such as audio data between an audio source device and an earbud, such as the primary earbud.

Link characteristics refers to any type of characteristic or attribute of a connection or link, such as a connection or link between two devices, such as the ear buds 202. Link characteristic may refer to, identify or include information related to operation, performance, authentication, authorization or security of a connection. For example, link characteristics can include various credentials, device identifiers, pairing information, profiles, frequency hopping sequences, communication channels, or slot timing. The credentials can include link keys, decryption keys, or other tokens as may be used to derive data of a packet or stream therefrom (e.g., to derive audio data from a Bluetooth packet). Such link characteristics may be used for encoding and/or decoding data.

Each of the shadow earbud 202A and the primary earbud 202B can receive audio data from an audio source device 216, such as the depicted example of a mobile phone. For example, the primary earbud 202B can negotiate a first connection 201 (e.g., a Bluetooth link) between the audio source device 216 and the primary earbud 202B. The shadow earbud 202A can monitor the first connection 201 via a non-targeted receiver path (referred to as a shadow connection 203). For example, the shadow earbud 202A can receive audio data via the shadow connection 203 such that each of the shadow earbud 202A and primary earbud 202B can provide audio to a user. In some embodiments, the shadow earbud 202A can monitor the first connection 201 using link information received over a bridge connection 205 between the pair of earbuds 202. The link information can include a Bluetooth device address for either of the audio source device 216 or primary earbud 202B, clock offset, frequency hopping pattern, or session parameters, such as a link type or audio codec. In some embodiments, the link information includes security credentials such as a link key for the first connection 201, access code (e.g., channel access code), or other authentication or decryption data.

A shadow connection may refer to or include a path between the audio source device and another device (e.g., the shadow earbud). For example, the shadow connection may be established, by the shadow earbud, by decoding information from the wireless medium, using link characteristic data. A bridge connection may refer to or include a communications channel established between the primary earbud and the shadow earbud. For example, the bridge connection can be used to convey audio data or link characteristics between earbuds.

A Bluetooth link may refer to or include a connection established between devices using the Bluetooth protocol, in some embodiments. Each link may be established with one or more configuration settings. For example, some audio streaming links may be established using a Bluetooth classic connection (e.g., using an advanced audio distribution profile (A2DP) connection), while other links may be established using other connections, such as a Bluetooth low energy (BLE) link (e.g., a two-megabit PHY link, (LE2M) connection).

As is depicted, the environment surrounding the pair of audio devices 202 and the audio source device 216 can includes various obstructions 220 such as walls, equipment, or people (e.g., a head of a user wearing the earbuds 202). Moreover, even where no obstructions 220 are present, differing signal path lengths or antennae orientations can modulate the received signal strength according to variation between the first connection 201 and the shadow connection 203. In some cases, the shadow connection 203 can become impaired, while the bridge connection 205 and the first connection 201 is active. According to such a scenario, the primary earbud 202B can provide an indication of received audio data to the shadow earbud 202A, as may be provided according to a transmission of the audio data itself, or a provision of a flag or other indication of the receipt of the audio data, by the primary earbud 202B. The indication can include an indication of any adjustments to an RX window, such that the shadow earbud 202A can continue to monitor the window, or the shadow earbud 202A may be configured to presume a lack of drift.

The primary earbud 202B can establish the bridge connection 205 with the shadow earbud 202A (as may be negotiated or instantiated by either of the primary earbud 202B or the shadow earbud 202A). The primary earbud 202B can provide, via the bridge connection 205, link information to the shadow earbud 202A, which the shadow earbud 202A can use to monitor the first connection 201 (which may be referred to as establishing the shadow connection 203). In some embodiments, the primary earbud 202B can provide, to the shadow earbud 202A, audio data. The audio data provided to the shadow earbud 202A can include same audio data received by the primary earbud 202B over the first connection 201 or can vary therefrom. For example, the primary earbud 202B can compress the audio data for provision to the shadow earbud 202A, or otherwise transmit a subset of audio data (e.g., left or right-channel data). Such compression may, for example, aid in the retransmission of audio data where a bridge connection 205 is provided as a lower power or lower throughput link, relative to the first connection 201. In some embodiments, the primary earbud 202B can retransmit the audio data responsive to an indication of non-receipt of the audio data (e.g., an indication provided by the shadow earbud 202A via the bridge connection 205). Such a technique can reduce power use of the primary earbud 202B, avoiding retransmission of audio data when the shadow connection 203 is active, as may be communicated from the shadow earbud 202A to the primary earbud 202B. In some cases, the primary earbud 202B can provide further indications (e.g., to indicate non-receipt of audio data, as may be indicative of loss of communication with the audio source device 216).

In some embodiments, the roles of shadow earbud 202A and the primary earbud 202B can be arbitrated between the respective devices. Accordingly, the shadow earbud 202A and the primary earbud 202B are depicted as having congruent components. In some implementations, the shadow earbud 202A and the primary earbud 202B can be predefined, as in the case of a left and right earbud, such that certain functions may be omitted or modified between the earbuds 202. However, as provided herein, the components will be referred to generally, according to a role-agnostic pair which can arbitrate to function as either of a shadow earbud 202A or primary earbud 202B.

Each of the earbuds includes a speaker 204 (depicted as speaker 204A and speaker 204B) as may be implemented according to various transducers to cause the output of the audio data. The output of the speakers can correspond to data packets including audio data received by the transceiver 206. For example, each packet can include tens of milliseconds of data for the speakers, in some embodiments.

Each of the earbuds 202 includes at least one transceiver 206 (depicted as transceiver 206A and transceiver 206B). The transceiver 206 includes antennae, amplifiers, buffers, or other components configured to communicate information (send or receive) via a transmission medium. For example, in some embodiments, the transceivers 206 may be implemented as a Bluetooth transceiver 206, Wi-Fi transceiver 206, or other wireless transceivers. In some embodiments, a same transceiver 206 can communicate via multiple communications links. In some embodiments, separate transceivers 206 can be dedicated for separate links. For example, a transceiver 206 for a bridge connection 205 and first connection 201 or shadow connection 203 can be implemented according to separate physical antennae, amplifier, buffer, or so forth. In some embodiments, a same transceiver 206 can communicate over multiple channels according to a temporal schedule, an example of which is provided hereinafter with regard to FIG. 3.

Each of the earbuds 202 includes a timing component 208 (depicted as timer/synchronizer 208A and timer/synchronizer 208B). The timing component 208 can include a synchronizer to synchronize communications windows (e.g., RX or TX windows) with an availability of data. For example, the synchronizer can update an RX window to center on received data to offset any drift between devices. Recentering may refer to centering a beginning, end, or other portion of received data within an RX window. For example, the recentering can align the beginning of received data with a first ten percent of the RX window, such that, for a maximum or other expected packet size, a received packet can fit within the RX window.

A timer may refer to or include a mechanism to track periods of time, time intervals, or elapsed time, as may be used to trigger actions such as resynchronizations or transitioning to an inactive state, according to some embodiments. For example, a supervision timer can toll during periods of non-communication with another device, such that upon the timer reaching a target value, the device can take a further action. For example, such further action can include shutting down to conserve battery power or adjusting a size of an RX window. In some embodiments, the timer can be extended (e.g., reset) based on one or more criteria. For example, the supervision timer can be extended responsive to a detection of activity (e.g., a receipt of audio data) on at least one of the bridge connection or the shadow connection. A timeout period may refer to or include a time interval maintained by the timer (e.g., resetting or otherwise extending the timer), in some embodiments. Transitioning to an inactive state may refer to or include disabling one or more power consuming components of a device, in some embodiments. For example, the transition may refer to shutting down a transceiver, such as a Bluetooth transceiver, entering a sleep state, standby mode, or ceasing all operations.

Responsive to a non-detection of data, the synchronizer can extend an RX window, as may aid to receive data in the event of time drift beyond the limits of the RX window. However, extending the RX window can also increase power usage related to a total active time of a transceiver 206. The synchronizer may be configured to maintain a timing relationship including an RX window size upon a receipt of an indication of a connection status. For example, a primary earbud 202B can provide an indication of receipt of audio data (e.g., by retransmitting the audio data), which may indicate that audio data was transmitted within the receive window, and that expanding the receive window would not resolve a potential communication issue.

A status of a connection can refer to, identify, or include a state or status of operation or performance of the connection. The status of the connection may refer to, identify or include an indicator of signal strength or quality of the connection, whether or not the connection is active, inactive or idle. The status of the connection may refer to, identify or include a status of a timer or window to receive or transmit data. An indication of the status can include, for example, an indication of activity using the connection, such as a time elapsed from a previously detected packet, or a content of those packets. An indication can include a discrete indication (e.g., a flag bit indicating an active or open connection), or can be inferred from further indicia. For example, a retransmission of audio data via the bridge connection can indicate an active status of a connection from which the audio data was previously received. For example, a shadow earbud can infer that a first connection between a primary earbud and another device is operable and active based on a receipt of audio data via a bridge connection.

The timing component 208 can include a supervision timer to supervise a link time-out. For example, where a device does not receive a packet over a link for a predetermined amount of time (e.g., five seconds), the supervision timer can provide a flag or other indication to a power manager 210 to cause the earbud 202 to enter an indicative state. The earbud 202 may be configured to reset, or otherwise extend the timer upon a receipt of valid data over a connection, or responsive to other indications of a link status, such as an indication of activity over the first connection 201, as received over the bridge connection 205.

Each of the earbuds 202 includes a power management circuit 210 (depicted as power manager 210A and power manager 210B). The power management circuit 210 can transition the earbud between various states, where one or more components or functions are inactive (referred to generally as inactive states). For example, an inactive state can include powering down a display, transceiver 206, processor 121, speaker 204, or other component. For example, responsive to an expiration of a supervisory timer, the power management circuit 210 can enter a low power inactive state to preserve battery power or otherwise reduce energy usage.

Each of the earbuds can include an authenticator 212 (depicted as authenticator 212A and authenticator 212B). The authenticator 212 can generate or store credentials, such as a device identifier, preconfigured device security keys, a link key unique to a pairing (e.g., the pairing to establish the first connection 201), or other session keys. The authenticator 212B of a primary earbud may be configured to transmit credentials to a shadow earbud 202A over a bridge connection 205. The authenticator 212A of a shadow earbud may be configured to receive credentials from a primary earbud 202B to monitor the first connection 201 (e.g., to establish the shadow connection 203).

Each of the earbuds can include an arbitrator 214 (depicted as arbitrator 214A and arbitrator 214B). The arbitrators 214 can negotiate a role with other arbitrator instances. For example, in some instances, a first earbud to power on can broadcast an arbitration message and assume a role as a leader in the absence of a reply and a follower in the case of a reply (indicating another device is already in an active state). In some embodiments, one earbud may be initially coded to act as a leader by default but can transition to a follower role upon receiving a reply or non-reply from another device. According to further embodiments, the arbitrator 214 can function according to further techniques, such as token-passing, round-robin, polling, or so forth, or may arbitrate with a further device, such as a smart charging case for the earbuds 202, a mobile phone coupled with the earbuds 202, or so forth.

Arbitration may refer to or include the process of managing or resolving roles or responsibilities between multiple devices (e.g., determining a role within a leader/follower schema), in some embodiments. For example, a pair of earbuds may determine a primary and shadow earbud according to arbitration, in some embodiments, such that either earbud can adopt either role, as opposed to embodiments, wherein one earbud (e.g., a right earbud) is predesignated as a primary earbud. For example, a first earbud to establish a connection with a further device (e.g., an audio source device, such as a mobile phone) can assume a role of leader and communicate with a second earbud to designate its role as a follower.

Figure 3:
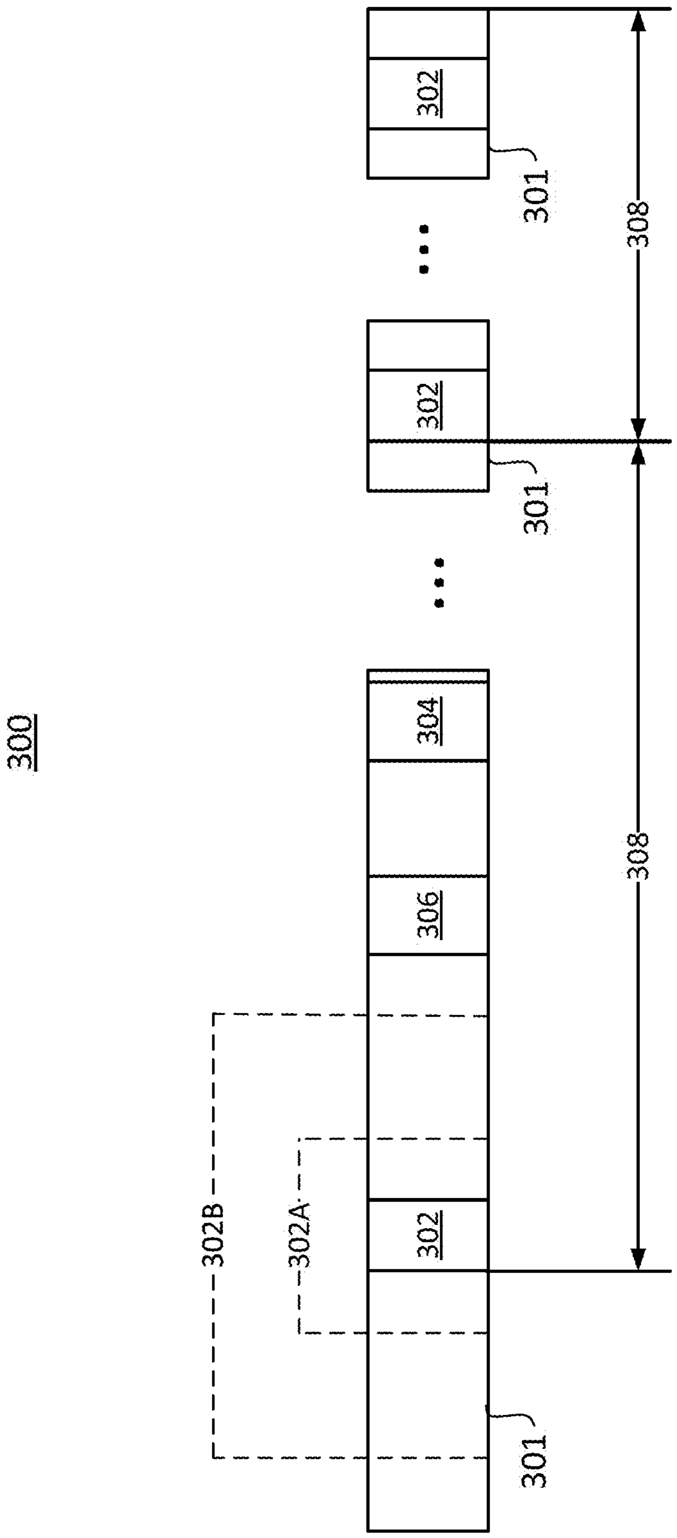
FIG. 3 is a timing slot diagram including variable receive windows, according to some embodiments.

Referring now to FIG. 3, a timing slot diagram 300 including variable receive windows is provided, according to some embodiments. The depicted timing slot diagram 300 includes a timeline 301 for an environment including a pair of earbuds 202 and an audio source device 216. More particularly, the timeline 301 includes RX windows 302 of a shadow earbud 202A, as may correspond to the shadow connection 203. That is, the shadow earbud 202A can be configured to activate a transceiver during the RX window 302, to receive communication over the first connection 201 from the audio source device 216 to the primary earbud 202B, via the shadow connection 203. Upon detection of such communication, the shadow earbud 202A can compensate for any drift with a transmitter of the audio data (the audio source device 216), by recentering or otherwise synchronizing the RX window on the received data.

In addition to the RX window 302 for the shadow connection 203, the timeline 301 include additional times, as may be dedicated for other devices, other functions, or so forth. For example, a second RX window 304 may correspond to an RX window for the bridge connection 205, while a third window 306 may correspond to a communications link separate from the shadow connection 203, such as an uplink from the primary earbud 202B to the audio source device 216 (e.g., an RX window with regard to the audio source device 216 and a TX window with regard to primary earbud 202B, as may be used to provide volume controls, pause commands, or other uplink communications). As is depicted, the RX window 302, like other periods of the timeline 301, can be configured to repeat according to a regular period 308. Although a duration of the period 308 may be shared between devices, because timing parameters may drift, over time, a duration may be adjusted slightly to maintain synchronicity between devices. For example, where data arrives a clock tick early (about 312 microseconds), a subsequent period 308A may be abbreviated by a corresponding amount to maintain synchronicity.

A failure to receive audio data may refer to or include non-detection of audio data for a period of time, such as one or more periods of scheduled transmission for that audio data. For example, a failure to receive audio data can refer to an expiration of a timer of one or more RX windows without receipt of audio data or the non-receipt of audio data during one or more RX Windows. A restoration of the audio data may refer to or include detection of audio data subsequent to a detection of the failure to receive.

Upon a failure to detect audio data during one or more sequential RX windows 302, the shadow earbud 202A may be configured to expand the window. The expand the window, the shadow earbud 202A can adjust a beginning or ending time for the RX window 302. For example, after a first period of time, (as may correspond to a predefined number of periods 308, or at least a portion of the supervision timer), the shadow earbud 202A can expand the RX window 302 to the depicted delimiters of the first expansion of the RX window 302A. After a second period of time without receipt of data, the shadow earbud 202A can expand the RX window 302A to the depicted delimiters of the second expansion of the RX window 302B. The shadow earbud 202A can continue to expand the RX window 302 until data is received, or a timer (e.g., the supervision timer) expires so as to cause the shadow earbud 202A to transition to an inactive state.

Where the RX window 302 is expanded incident to a timing drift, upon expanding the RX window 302, the shadow earbud 202A can detect data, resynchronize the RX window 302 to the data, and reduce the window size, such that power usage to expand the RX window 302 may be limited to a small number of instances (e.g., to the first or second expansion of the RX window 302A, 302B). However, where no data is received because of a degraded shadow connection 203 (e.g., subthreshold received signal strength), expanding the RX window 302 will not generally improve detection, but will increase energy usage. In some cases, the RX window 302 may expand until enveloping another window (e.g., the third window 306), and may resynchronize to that window. Accordingly, even received signal strength via the shadow connection 203 improves, the shadow earbud 202A may have an inactive transceiver during the designated window 302, having synchronized to the spurious data of the third window 306. Accordingly, an indication of audio data received over the first connection 201, from the primary earbud 202B, can cause the shadow earbud 202A to maintain synchronization of the RX window 302, to reduce power use relative to expanding the RX window 302, and avoid synchronizing to spurious transmissions.

Figure 4:
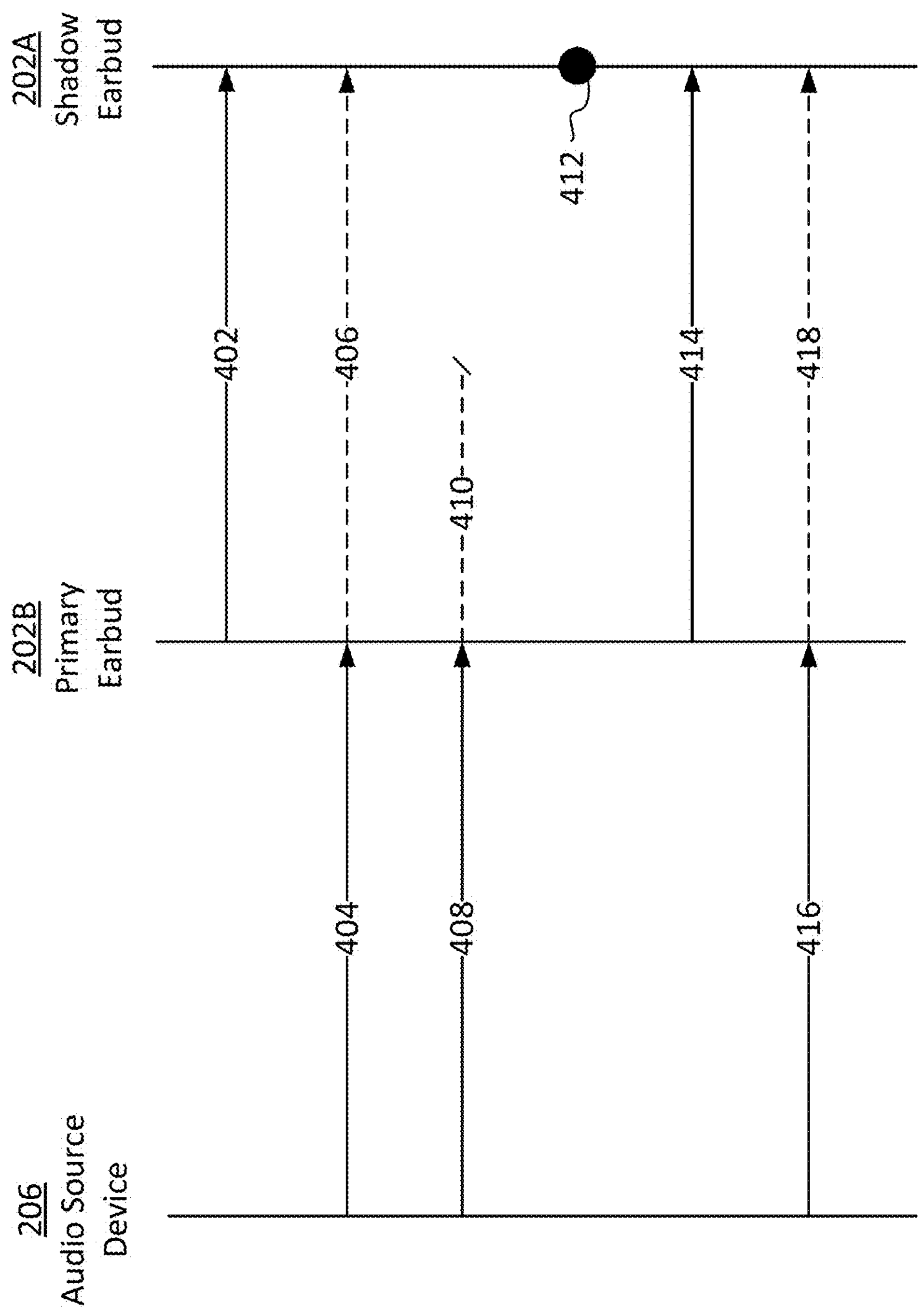
FIG. 4 is a sequence diagram for synchronizing audio content, according to some embodiments.

Referring now to FIG. 4, a sequence diagram 400 for synchronizing audio content is provided, according to some embodiments. The sequence diagram 400 can correspond to an environment including a primary earbud 202B coupled with an audio source device 216 via a first connection 201. For example, the primary earbud 202B can negotiate or otherwise establish the first connection 201 with the audio source device 216 to receive audio data from the audio source device 216 via the first connection 201. The establishment of the first connection 201 can include a generation or retrieval of link characteristics for the first connection 201, as may include credentials, timing windows or other timing relationships, and so forth.

A timing relationship can refer to, identify or include a temporal aspect of communication which is received or transmitted by, determined based on, or synchronized between two or more devices or connections. For example, a timing relationship can refer to a relationship between the first connection 201 and the bridge connection 205, wherein data conveyed over the bridge connection 205 can relate to information previously received via the first connection 201. Audio data, for example, received via the bridge connection 205 can evidence a prior receipt of the audio data via a timing window, as may correspond to a timing window of the shadow earbud 202A. That is, according to the timing relationship, a shadow earbud 202A can determine that audio data was transmitted during a pendency of a timing window, even where the shadow earbud 202A does not itself receive the audio data.

In some embodiments, the timing relationship may be determined locally, based on the receipt of audio data. For example, a device receiving audio data can align (e.g., recenter) an RX window to a reception of data to avoid drift between devices (e.g., as may arise from crystal aging, temperature variation, or so forth). Resynchronization can refer to or include adjusting a timing relationship between connected devices, in some embodiments. For example, as indicated above, a shadow earbud can align (e.g., recenter) an RX window to resynchronize with an audio source device.

At operation 402, the primary earbud 202B communicates link characteristics for a first connection 201 to the shadow earbud 202A. The link characteristics may be communicated over a pre-existing bridge connection 205, or such a connection may be established incident to the communication of the link characteristics. In some embodiments, the primary earbud 202B can provide updates of various of the link characteristics via the bridge connection 205 to the shadow earbud 202A, such as periodically, or responsive to a trigger condition, such as a resynchronization (e.g., recentering a timing window). Upon receipt of the link characteristics, the shadow earbud 202A can establish a shadow connection 203 with the audio source device 216 to receive the audio data from the audio source device 216.

At operation 404 and 406, an example of the receipt of the audio data over the shadow connection 203 is provided. The audio source device 216 can provide the audio data to the primary earbud 202B via the first connection 201 at operation 404 (e.g., via a communication packet addressing the primary earbud 202B). At operation 406, the shadow earbud 202A receives the audio data, although it may be addressed to the primary earbud 202B. For example, the shadow earbud 202A can use the link characteristics received at operation 402 to monitor the first connection 201. Operations 404 and 406 can repeat for as long as the shadow connection 203 remains present and the first connection 201 remains active.

At operation 408, the primary earbud 202B receives the audio data, but the shadow earbud 202A fails to detect the audio data (e.g., operation 410 fails to communicate the audio data to the shadow earbud 202A). At operation 412, the shadow earbud 202A detects the failure to receive the audio data on the shadow connection 203. For example, the detection of the failure can be responsive to an elapsing of a predefined time or integer number (one or more) RX windows 302 for the shadow connection 203 without a receipt of audio data. Further, at operation 412, the shadow earbud 202A can use the timing relationship to synchronize a timing window for which to communicate with the audio source device 216. For example, the shadow earbud 202A can maintain the timing relationship without expanding the RX window 302 or may extend a timer to remain in an active state.

In some embodiments, as depicted at operation 414, the shadow earbud 202A receives, via the bridge connection 205, an indication of received audio data. The indication can be provided as a bit flag indicting receipt (or non-receipt), a time of receipt or associated timing window adjustment or non-adjustment, or the audio data itself. In some embodiments, the indication provided to the shadow earbud 202A from the primary earbud 202B is provided responsive to a request from the shadow earbud 202A, which the shadow earbud 202A may communicate responsive to the failure to detect the audio data. Accordingly, the communication of the indication (e.g., the audio data) can be avoided where the shadow connection 203 is not degraded. This may conserve battery life of the primary earbud 202B by avoiding extraneous transmissions of the audio data, even where the bridge connection 205 is provided over a relatively low power link. Where audio data is conveyed at operation 414, the audio data can be the audio data of operation 408 and 410, or subsequent audio data (e.g., to account for delays in detecting the failure to receive the audio data on the shadow connection 203, to account for an audio buffer of the shadow earbud 202A, or so forth).

The shadow earbud 202A can, responsive to a receipt of the indication from the primary earbud 202B, maintain or adjust a timing relationship between the bridge connection 205 and the shadow connection 203. For example, the shadow earbud 202A can determine that audio received by the primary earbud 202B during a scheduled transmission time has not suffered from drift. In some embodiments, the shadow earbud 202A can further validate a presence or absence of drift between the earbuds 202, but such an operation may be omitted in some embodiments. For example, where the respective earbuds 202 include a same or similar design, components, and environment, the inter-earbud drift may not be compensated for, according to some implementations of the present disclosure. Operation 414 may be repeated any number of times (e.g., for any number of audio packets, or other indications), during which time, the shadow earbud 202A can maintain the timing relationship (e.g., the RX window 302) for the shadow connection, and may continue to extend (e.g., reset) a supervision timer upon receipt of audio data.

In some cases, prior to the execution of operation 416, the shadow connection 203 may be re-established, such as according to a removal of an obstruction 220, reorientation of an antenna, reduction in distance between the audio source device 216 and the shadow earbud 202A, etc. Accordingly, at operation 416, like operation 404, the primary earbud 202B can receive audio data. The shadow earbud 202A can receive the audio data at operation 418. In some embodiments, the shadow earbud 202A can communicate the re-establishment of the shadow connection with the primary earbud 202B, whereupon the primary earbud 202B can cease transmission of audio data (or other transmission indicating a receipt of audio data). In some instances, such as where operation 416 does not occur prior to the expiration of a timer (e.g., a five-second supervisory timer or a five-minute supervisory timer), the shadow earbud 202A can transition to an inactive state without conducting the adjustments to the RX window 302 as may fruitlessly use battery life.

Figure 5:
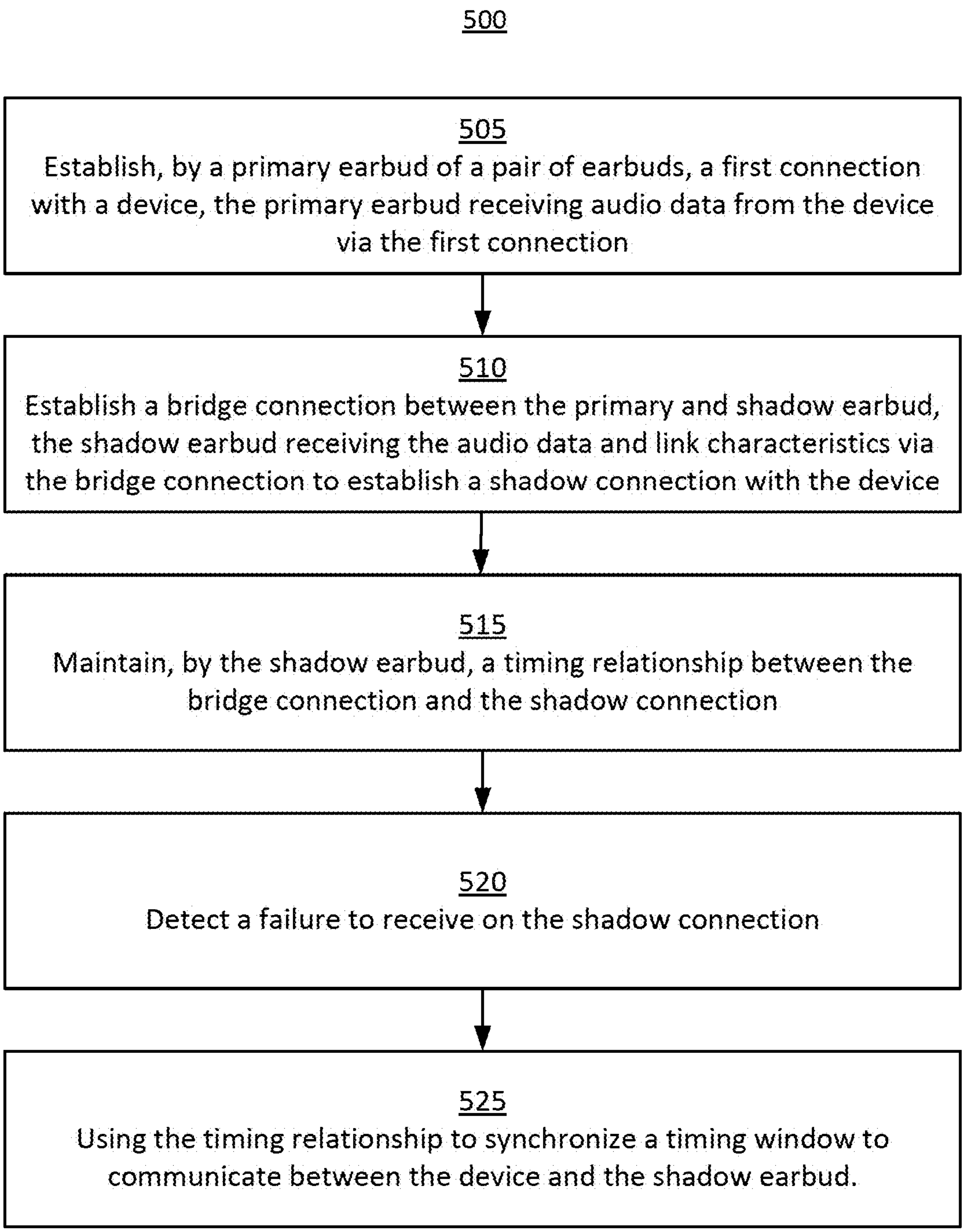
FIG. 5 is a flow diagram for a method, according to some embodiments.

FIG. 5 is a flow diagram for a method 500, according to some embodiments. The method 500 may be performed by at least one of a pair of earbuds 202 (sometimes referred to as a shadow earbud 202A). The method 500 may be performed in conjunction with further devices, such as a primary earbud 202B of the pair of earbuds 202 including the shadow earbud 202A and a mobile phone or other audio source device 216. The operations provided hereinafter are not intended to be limiting. According to various embodiments, the method 500 can add, substitute, modify or omit one or more operations according to the various aspects of the present disclosure, or otherwise. For example, although not explicitly described as an operation of the method 500, the method 500 can include identifying, between the pair of earbuds, one earbud of the pair as the primary earbud 202B and another earbud of the pair of earbuds as the shadow earbud 202A. For example, the primary earbud 202B and shadow earbud 202A may be determined according to the various arbitration techniques described herein. Indeed, various of the operations can be modified according to various aspects of the present disclosure.

At operation 505, a primary earbud 202B of the pair of earbuds establishes a first connection 201 with a device (e.g., a mobile phone or other audio source device 216). The primary earbud 202B can proceed to receive audio data from the device via the first connection 201.

The audio data can include packetized audio data, as may be received via various connection protocols. For example, the first connection may be established as a Bluetooth link between the device and the primary earbud 202B. The Bluetooth or other connection type may be initiated by the primary earbud 202B or the device. In some embodiments, the establishment of the first connection 201 can include a pairing of the primary earbud 202B (or a smart case, the shadow earbud 202A, etc.). However, the establishment of the first connection 201 at operation 505 need not include such pairing. For example, in some embodiments, the pairing can be executed prior to, or separately from operation 505. That is, the establishment of the first connection 201 of operation 505 can rely on previously negotiated credentials or link characteristics, or according to other pre-established credentials or link characteristics.

At operation 510, the primary earbud 202B and the shadow earbud 202A establish a bridge connection 205 therebetween. Like the first connection 201, link characteristics for the bridge connection 205 can, but need not be negotiated at a time of establishment. For example, in some embodiments, the link characteristics for the bridge connection 205 may be provided to each of the earbuds at the pair of earbuds at a time of manufacture, or thereafter, (e.g., in conjunction with a smart case). According to various embodiments, the bridge connection 205 may be implemented according to various connection types. For example, in some embodiments, the bridge connection 205 is established as a Bluetooth link between the primary earbud 202B and the shadow earbud 202A.

The bridge connection 205 can be a lower power connection that the first connection, even where the connections are both of a same type (e.g., are both Bluetooth links). For example, the first connection may be implemented as a Bluetooth classic link (e.g., Advanced Audio Distribution Profile, A2DP) while the bridge connection may be implemented according to an LE2M link.

Upon the establishment of the bridge connection 205, the shadow earbud 202A can receive, from the primary earbud 202B, via the bridge connection 205, audio link characteristics for the first connection 201 or audio data. The audio link characteristics for the first connection 201 can include any information as may be used by the shadow earbud 202A to monitor the first connection 201. For example, the link characteristics can include a timing relationship (e.g., a position of the RX window, link key, session key, address (e.g., BD_ADDR), frequency hopping parameters, packet structure, codec). In some embodiments, the link characteristics received by the shadow earbud 202A can include a credential such as an encryption or other authentication data, such as a passkey or pin as may have been exchanged between the primary earbud 202B and the audio source device 216 during pairing.

The audio data provided over the bridge connection 205 can include packetized audio data or timing information therefor, such as a transmittal time. In some embodiments, the shadow earbud 202A is configured to request a transmission of audio data responsive to a failure to receive expected audio data over the shadow connection 203. Such a handshake can avoid retransmission of audio data to the shadow earbud 202A, where the shadow connection 203 is not degraded, so as to avoid extraneous retransmission by the primary earbud 202B.

Upon the receipt of the link characteristics by the shadow earbud 202A, the shadow earbud 202A can establish the shadow connection 203 (e.g., can monitor the first connection 201). For example, the shadow earbud 202A can passively monitor the first connection 201 to detect audio data conveyed from an audio source device 216 to the primary earbud 202B. In embodiments, the link characteristics include one or more credentials, and the shadow earbud 202A can use the one or more credentials to establish the shadow connection 203.

In some embodiments, the lower power link of the bridge connection 205 can exhibit reduced bandwidth, relative to the first connection 201. However, data provided over the bridge connection 205 may be less than the first connection. For example, the primary earbud 202B can provide audio data to the shadow earbud 202A using a low-bandwidth techniques, such as by using a low complexity communications codec (LC3) or may provide indications of a receipt of audio without providing the audio data itself, in some embodiments. In some embodiments, the lower power link of the bridge connection 205 can exhibit reduced communications range, relative to the first connection 201. However, since earbuds are generally used proximal to one another, the bridge connection 205 may remain active, even where a first connection 201 is degraded due to a range or presence of obstructions 220.

At operation 515, the shadow earbud 202A can maintain a timing relationship between the bridge connection 205 and the shadow connection 203. In some embodiments, the shadow earbud 202A can maintain the timing relationship based on a receipt of audio data over the shadow connection. For example, where timer drift (e.g., oscillator drift) causes the audio data to be received later or earlier than expected, the shadow earbud 202A can adjust an RX window 302 to synchronize to the received audio data (e.g., by recentering the audio date into an RX window 302). Where no audio data is received, such as at operation 520 henceforth, the shadow earbud 202A can use audio data or other indications received via the bridge connection 205 to maintain the timing relationship. For example, the shadow earbud 202A can determine that audio data was provided within an RX window 302 based on receiving the audio data from the primary earbud 202B (because the primary earbud 202B would have received the audio data during a same RX window 302). In some embodiments, the shadow earbud 202A can determine the timing relationship according to a flag or other indication of adjustment or non-adjustment of the RX window 302.

In some embodiments, the timing relationship can include a timer, such as a supervisory timer for the shadow connection 203 (or the shadow earbud 202A generally). The maintenance of the timing relationship can aid to prevent an expiration of the timer. For example, the shadow earbud 202A can extend (e.g., reset) the timer defining a duration during which the shadow earbud 202A maintains an active state can receive the audio data via the shadow connection 203. The extension of the timer can be responsive to a detection of audio data as detected via at least one of the shadow connection 203 or the bridge connection 205.

At operation 520, the shadow earbud 202A detects a failure to receive on the shadow connection 203. As indicated above, the failure of detect can defer extension of the timer. Accordingly, the shadow earbud 202A can transition to an inactive state responsive to an expiration of the timer. The transition to the inactive state can aid in maintaining battery life and lower energy usage. For example, in some embodiments, the shadow earbud 202A can transition to the inactive state without expanding an RX window 302, and without incurring the associated energy usage and medium congestion.

At operation 525, the shadow earbud 202A can use the timing relationship to synchronize a timing window for which to communicate with the device. For example, by extending the time that the shadow earbud 202A remains in an active state, the shadow earbud can receive subsequent audio data via the shadow connection 203 (e.g., detect a restoration of the audio data). Similarly, by performing any adjustments to the RX window 302, the shadow earbud 202A can maintain synchronicity with the device to aid in the subsequent receipt of audio data. Accordingly, upon re-orientation of antenna, removal of obstructions 220, or reductions of range between the device transmitting the audio data and the shadow earbud 202A, the shadow earbud 202A can communicate with the device (e.g., receive audio data during the adjusted or unadjusted RX window).

In some embodiments, the shadow earbud 202A can adjust the timing relationship upon receipt of the audio data, such as by extending the timer or adjusting an RX window to compensate for any packets that were not received over the shadow connection 203 (e.g., packets that were received over the bridge connection 205). In some embodiments, the shadow earbud 202A detects an indication of a status of the first connection 201 via the bridge connection 205. For example, the indication can be provided as audio data or a flag, evidencing a health of the first connection 201. The shadow earbud 202A can extend the timer during which the shadow earbud is to receive the audio data via the shadow connection to maintain an active state responsive to the detection of the indication. For example, since the first connection 201 is active, the shadow earbud 202A can await further audio data.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure may reference terms such as "first" and "second" in connection with devices, mode of operation, transmit chains, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment. The terms coupled or connected includes indirect and direct couplings and connections.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure. The headings provided in this document are non-limiting.

The applications and servers have been described above with the aid of functional building blocks illustrating the performance of certain significant functions. The boundaries of these functional building blocks have been arbitrarily defined for convenience of description. Functions and structures can be integrated together across such boundaries. Alternate boundaries could be defined as long as the certain significant functions are appropriately performed. Similarly, flow diagram blocks may also have been arbitrarily defined herein to illustrate certain significant functionality. To the extent used, the flow boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

We claim:

1. A system comprising:
a primary earbud, the primary earbud configured to:
establish a first connection with a device, the first connection configured to convey audio data from the device to the primary earbud; and
establish a bridge connection with a shadow device, the bridge connection configured to communicate link characteristics comprising a timing window for the first connection; and
a shadow earbud, the shadow earbud configured to:
detect a failure to receive the audio data during the same timing window;
maintain, based at least on an indication of a status of the first connection, received via the bridge connection the timing window for a shadow connection to receive the audio data; and
receive, using the same timing window, subsequent audio data.

2. The system of claim 1, wherein:
the shadow earbud is configured to:
extend, responsive to a detection of a first of a plurality of packets carrying the audio data via the shadow connection, a timer during which the shadow earbud is to receive the audio data via the shadow connection to maintain an active state;
detect an expiration of the timer without detection any further or subsequent one or more packets; and
transition to a lower power state or mode, responsive to the expiration of the timer.

3. The system of claim 2, wherein the shadow earbud is configured to:
extend, responsive to a detection of a second of the plurality of packets via the bridge connection, the timer.

4. The system of claim 1, wherein the shadow earbud is configured to:
adjust the timing window based on data received via the bridge connection.

5. The system of claim 4, wherein the data received via the bridge connection comprises a packet comprising a portion of the audio data.

6. The system of claim 1, wherein:
the first connection is a first Bluetooth link between the device and the primary earbud; and
the bridge connection is a second Bluetooth link between the primary earbud and the shadow earbud, wherein the second Bluetooth link is a lower power connection than the first Bluetooth link.

7. A device comprising:
an audio output device configured to:
negotiate a role of a plurality of roles with a second audio output device, the plurality of roles corresponding to a primary mode and a shadow mode between the audio output device and the second audio output device;
during the primary mode:
establish a first connection with an audio source device, the first connection configured to convey audio data from the audio source device to the audio output device; and
establish a bridge connection with the second audio output device, the bridge connection configured to communicate link characteristics for the first connection; and
during the shadow mode:
detect, via a shadow connection using the link characteristics to monitor the first connection, a timing window for the audio data;
detect a failure to receive the audio data during the timing window on the shadow connection; and
extend a timer during which the audio output device is to receive the audio data via the shadow connection to maintain an active state, responsive to a receipt of a packet comprising the audio data via the bridge connection.

8. The device of claim 7, further configured to:
extend, in the shadow mode, the timer responsive to a receipt of a packet comprising the audio data via the shadow connection.

9. The device of claim 7, further configured to:
transmit, during the primary mode, the audio data received via the first connection to the second audio output device via the bridge connection; and
transitioning to an inactive state, during the shadow mode, responsive to an expiration of the timer without receipt of the audio data during the timing window.

10. The device of claim 7, wherein:

the first connection is a first Bluetooth link between the audio source device and the audio output device; and the bridge connection is a second Bluetooth link between the audio output device and the second audio output device, wherein the second Bluetooth link is a lower power connection than the first Bluetooth link.

11. A method comprising:

establishing, by a primary earbud of a pair of earbuds, a first connection with a device, the primary earbud receiving audio data from the device via the first connection;

establishing, between the primary earbud and a shadow earbud, a bridge connection, the shadow earbud receiving the audio data and link characteristics via the bridge connection to establish a shadow connection with the device to receive the audio data from the device;

maintaining, by the shadow earbud, a timing relationship between the bridge connection and the shadow connection;

detecting, by the shadow earbud, a failure to receive on the shadow connection; and using, by the shadow earbud, the timing relationship to synchronize a timing window for which to communicate with the device.

12. The method of claim 11, further comprising:

detecting, by the shadow earbud, a restoration of the audio data subsequent to the failure to receive; and adjusting, by the shadow earbud, the timing relationship to resynchronize with the device.

13. The method of claim 12, further comprising:

detecting, by the shadow earbud, subsequent to the failure to receive and prior to the restoration of the audio data, an indication of a status of the first connection via the bridge connection; and extending, by the shadow earbud, responsive to the detection of the indication, a timer during which the shadow earbud is to receive the audio data via the shadow connection to maintain an active state.

14. The method of claim 13, further comprising:

transmitting, by the primary earbud, the indication to the shadow earbud, the indication comprising the audio data.

15. The method of claim 11, further comprising:

detecting the audio data via at least one of the shadow connection or the bridge connection; and extend a timer during which the shadow earbud is to receive the audio data via the shadow connection to maintain an active state, responsive to the detection of the audio data.

16. The method of claim 11, further comprising:

transitioning to an inactive state, responsive to an expiration of a timer for at least one of the shadow connection or the bridge connection.

17. The method of claim 11, wherein the shadow earbud is configured to:

receive, from the primary earbud over the bridge connection, a credential; and using the credential to establish the shadow connection.

18. The method of claim 11, wherein:

the first connection is a first Bluetooth link between the device and the primary earbud; and the bridge connection is a second Bluetooth link between the primary earbud and the shadow earbud.

19. The method of claim 18, wherein the second Bluetooth link is a lower power connection than the first Bluetooth link.

20. The method of claim 11, further comprising:

identifying between the pair of earbuds:

a first earbud of the pair of earbuds as the primary earbud; and a second earbud of the pair of earbuds as the shadow earbud.

* * * * *